United States Patent [19]
O'Brien, Jr.

[11] Patent Number: 5,966,414
[45] Date of Patent: Oct. 12, 1999

[54] SYSTEM AND METHOD FOR PROCESSING SIGNALS TO DETERMINE THEIR STOCHASTIC PROPERTIES

[75] Inventor: Francis J. O'Brien, Jr., Newport, R.I.

[73] Assignee: The United States of America as represented by the Secretary of the Navy, Washington, D.C.

[21] Appl. No.: 08/412,260

[22] Filed: Mar. 28, 1995

[51] Int. Cl.[6] ............................................. H04B 1/10
[52] U.S. Cl. ............................. 375/346; 455/63; 455/296
[58] Field of Search .................................... 375/346, 351, 375/326; 455/218, 63, 67.3, 296, 222, 223

[56] References Cited

U.S. PATENT DOCUMENTS

| | | | |
|---|---|---|---|
| 4,063,180 | 12/1977 | Norman | 375/351 |
| 5,161,185 | 11/1992 | Hochschild | 375/351 |
| 5,333,153 | 7/1994 | Brown et al. | 375/351 |

*Primary Examiner*—Temesghen Ghebretinsae
*Attorney, Agent, or Firm*—Michael J. McGowan; Michael F. Oglo; Prithvi C. Lall

[57] ABSTRACT

A signal processing system processes a digital signal, generated in response to an analog signal which includes a noise component and possibly also an information component. An information processing sub-system receives said digital signal and processes it to extract the information component. A noise likelihood determination sub-system receives the digital signal and generates a random noise assessment that the digital signal comprises solely random noise, and controls the operation of the information processing sub-system in response to the random noise assessment.

10 Claims, 6 Drawing Sheets

SYSTEM AND METHOD FOR PROCESSING SIGNALS TO DETERMINE THEIR STOCHASTIC PROPERTIES

STATEMENT OF GOVERNMENT INTEREST

The invention described herein may be manufactured by or for the Government of the United States of America for Governmental purposes without the payment of any royalties thereon or therefor.

BACKGROUND OF THE INVENTION (1) Field of the Invention

The invention relates generally to the field of systems and methods for performing digital signal processing operations in connection with signals and more particularly to systems and methods for characterizing signals to determine their stochastic properties, that is, to determine whether they are random. If the signals are random, they may be determined to constitute noise, in which case additional signal processing efforts which might be undertaken to process the signals to extract information therefrom can be avoided.

(2) Description of the Prior Art

In a number of applications, it is desirable to be able to determine the likelihood that a signal is random. For example, an acoustic signal, received in an ocean environment, may constitute noise alone, or it may include some useful "information" along with a background noise. If the signal constitutes noise alone, its amplitude will be random, but if it includes information it will not be random and further processing may be useful to identify the information. In some signal processing systems, it is assumed that the signal includes information, and the signal is processed to try to extract the intelligence. It may be the case that the noise level of a received signal is so great that the information cannot be extracted, but if the signal is pure noise, no information will be extracted and the processing effort will be wasted in any event. It is accordingly desirable to be able to determine the likelihood that a signal constitutes only noise, or if it also includes information so that a determination can be made as to whether processing of the signal to extract the information would be useful.

SUMMARY OF THE INVENTION

It is therefore an object of the invention to provide a new and improved signal processing system for processing signals to determine their stochastic (random) properties.

In brief summary, the signal processing system processes a digital signal, generated in response to an analog signal which includes a noise component and possibly also an information component. An information processing sub-system receives the digital signal and processes it to extract the information component. A noise likelihood determination sub-system receives the digital signal and generates a random noise assessment that the digital signal comprises solely random noise, and controls the operation of the information processing sub-system in response to the random noise assessment.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
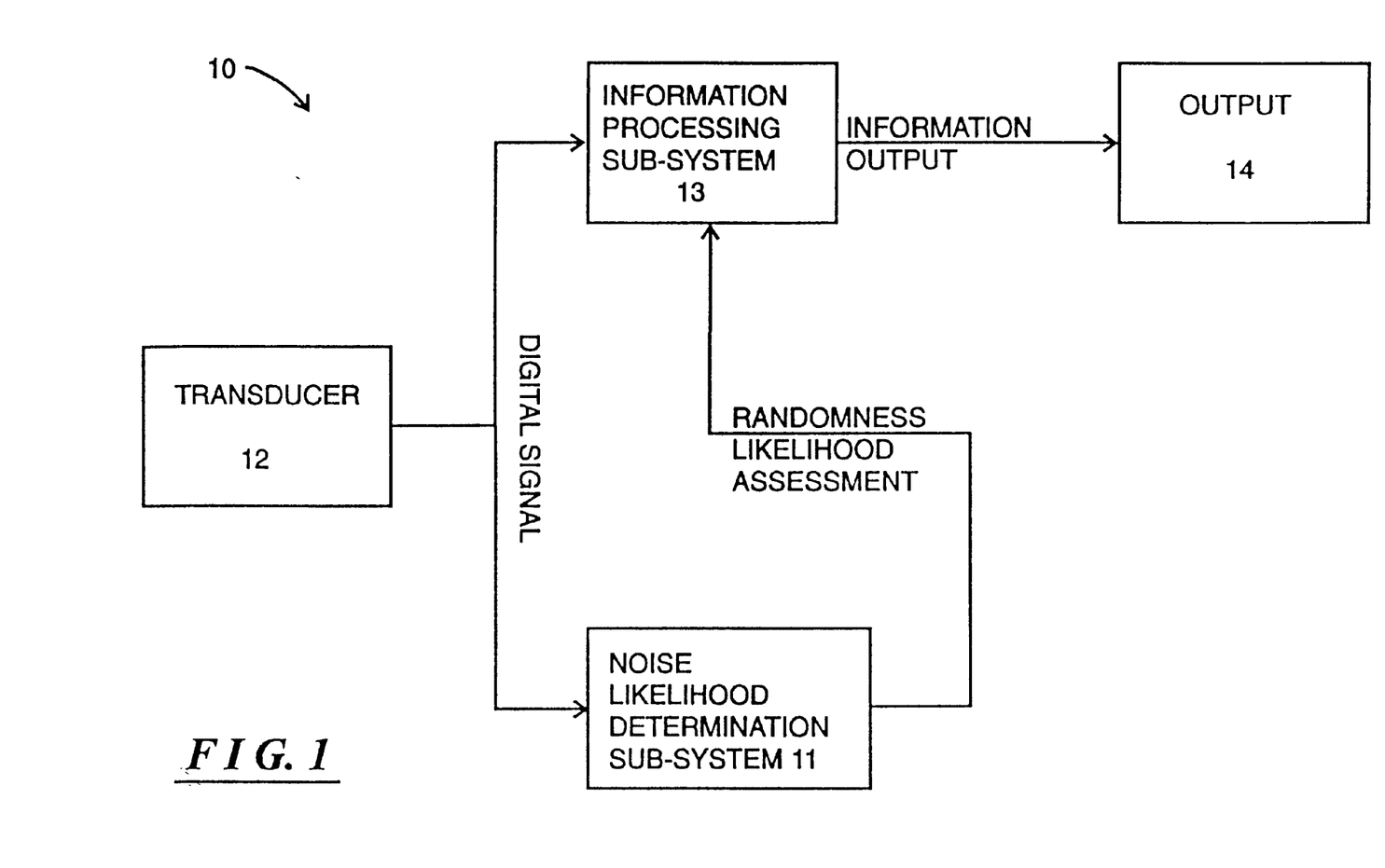
FIG. 1 is a functional block diagram of a signal processing system constructed in accordance with the invention.

The invention provides a signal processing system 10 including a noise likelihood determination sub-system 11 constructed in accordance with the invention. FIG. 1 is a functional block diagram of the signal processing system 10. With reference to FIG. 1, the signal processing system 10 includes, in addition to the noise likelihood determination sub-system 11, a transducer 12, an information processing sub-system 13 and an output 14. The transducer receives the signal, which is in acoustic, electrical, electromagnetic or other form and converts it to preferably digital form for processing. The digital signal may, for example, represent the amplitude of the received signal sampled at successive time intervals. The information processing sub-system 13 performs conventional signal processing operations, such as adaptive and other filtering, to attempt to extract an information component from the digital signal. In accordance with the invention, the noise likelihood determination sub-system 11 determines the likelihood that the signal is solely noise, in which case the information processing sub-system 13 can determine that it will not process the digital signal since it will not result in an output of information.

Figure 2A:
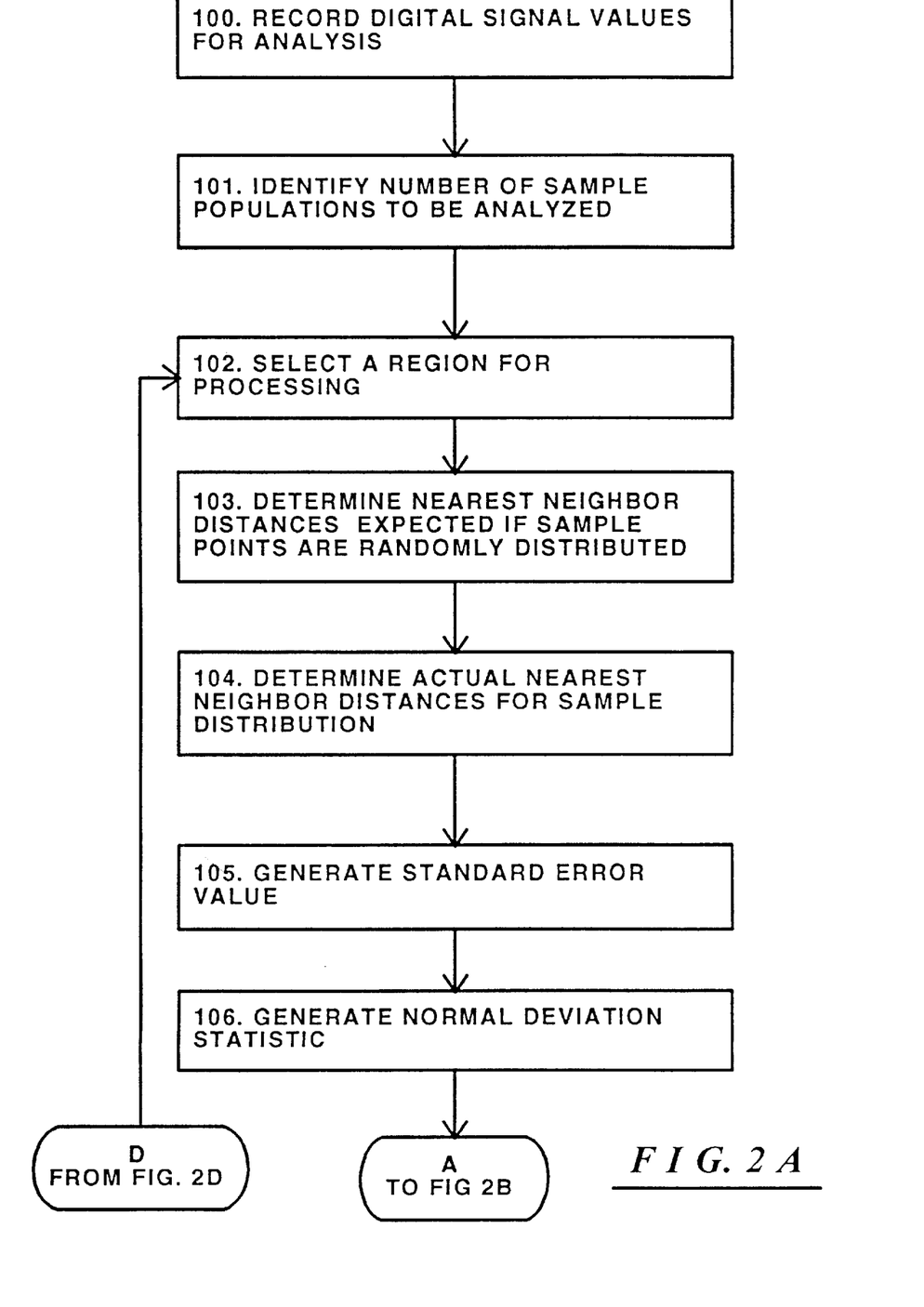
FIGS. 2A through 2D together comprise a flow chart depicting the operations of the system depicted in FIG. 1.
Figure 2B:
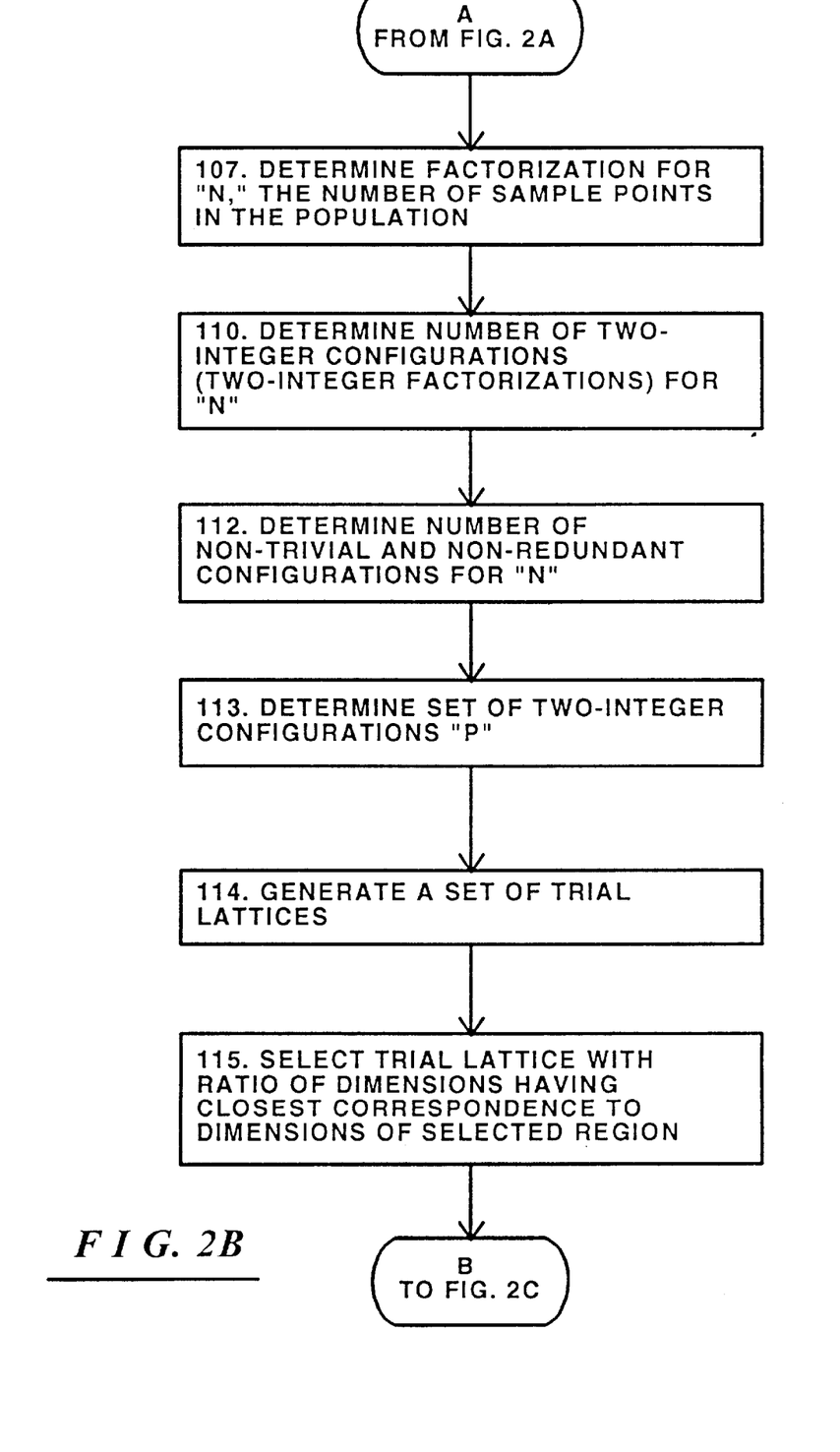
Figure 2C:
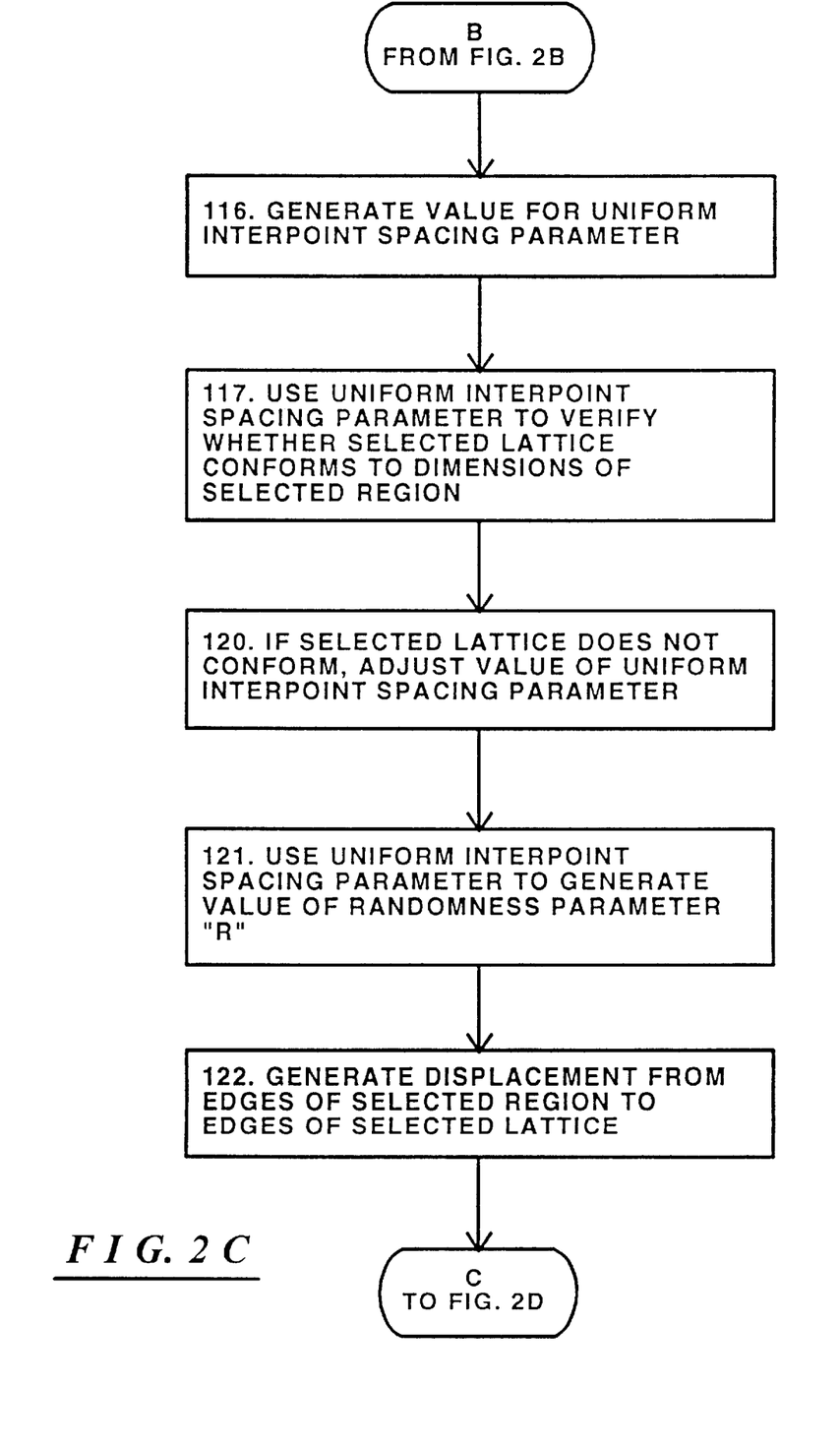
Figure 2D:
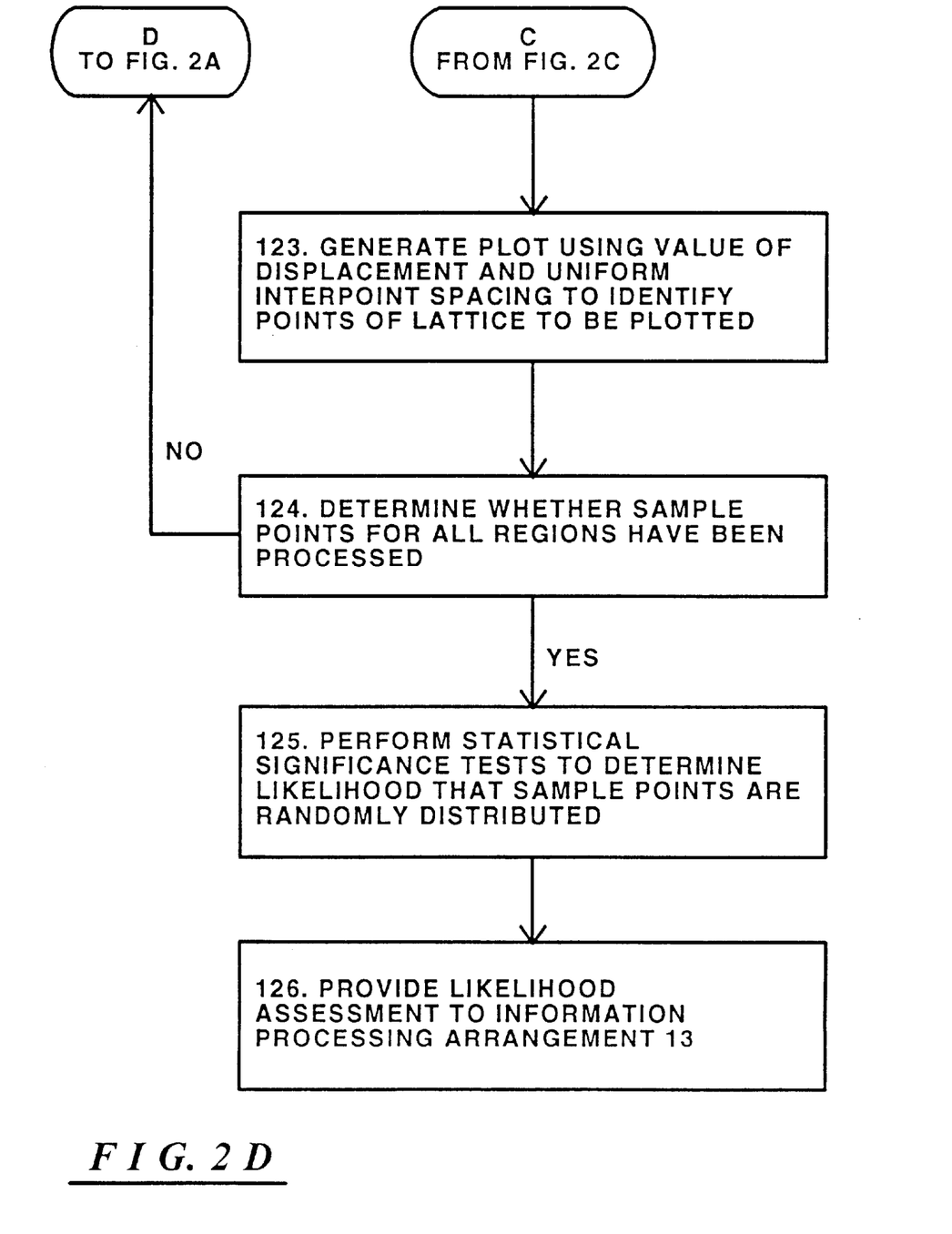
Figure 3:
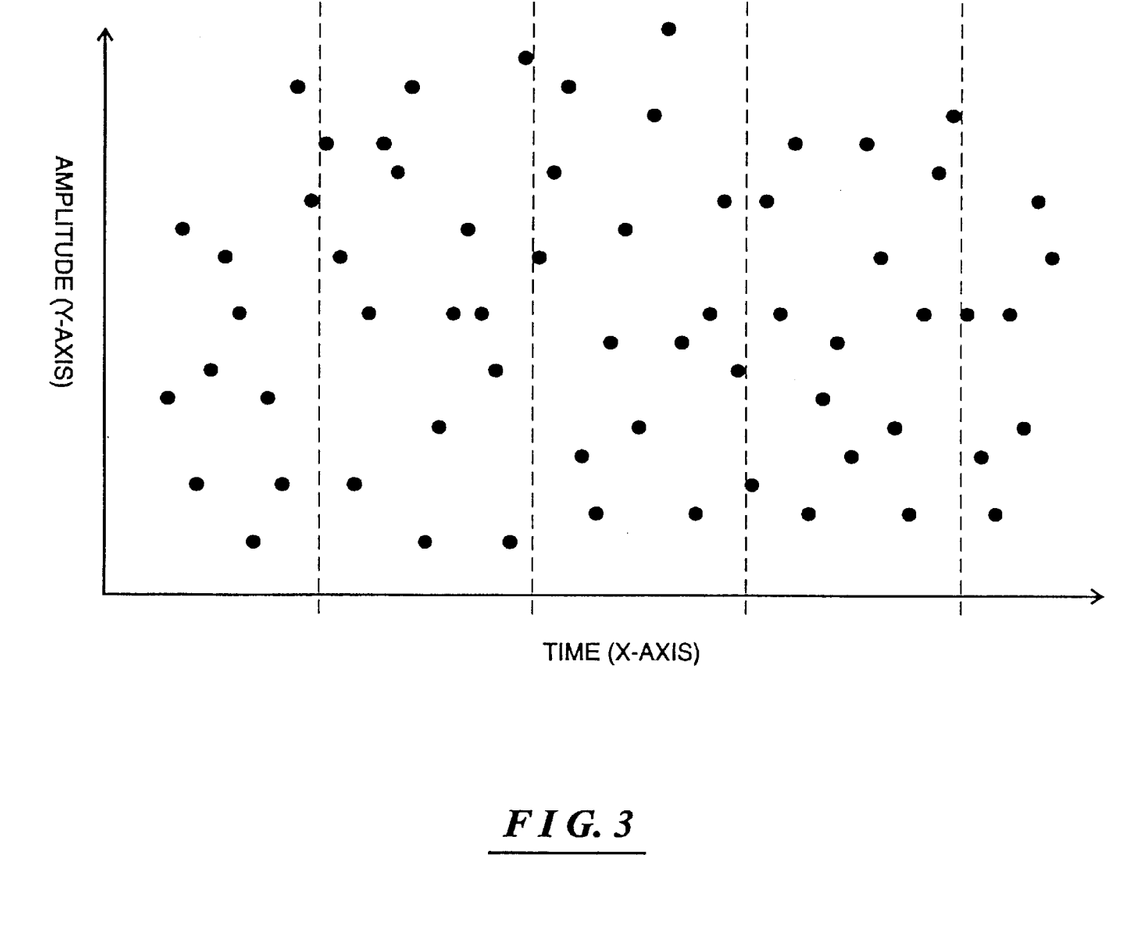
FIG. 3 is a diagram useful in understanding the operations performed by the system 10.

The operations performed by the noise likelihood determination sub-system 11 will be described in connection with the flowchart in FIGS. 2A through 2D. Generally, the noise likelihood determination sub-system 11 performs several tests in connection with a number of populations of the digital signals, each digital signal being referred to hereinafter as a "point," with each population comprising a series of digital signals generated for, for example, a series of windows representing intervals of, for example, time. The time windows used in generating the various populations may be overlapping or non-overlapping. FIG. 3 illustrates a number of digital data points, representing amplitudes of a signal taken at successive points in time. The horizontal "x" axis represents time, and the vertical "y" axis represents amplitude, and successive populations, represented by successive non-overlapped windows in time, are indicated by broken vertical lines.

With reference again to the flow chart of FIG. 2, the noise likelihood determination sub-system 11 will initially record the digital values represented by the various sample points, such as shown in FIG. 3, for analysis (step 100) and identify the number of populations of sample points to be analyzed (step 101).

The noise likelihood determination sub-system 11 then proceeds to a series of iterations, in each iteration selecting one sample point population and generating several metrics useful in determining the likelihood that the sample points in the population are randomly distributed in the region containing the sample, that is, in the portion of the Cartesian (that is, the x-y plane) containing the set of sample points in the population. It will be appreciated that the region containing each sample is bounded along the time axis (that is, the horizontal, or "x" axis shown in FIG. 3) by the beginning and end points of the time window for the region, and along the amplitude axis (that is, the vertical, or "y" axis shown in FIG. 3) by arbitrary minimum and maximum amplitude values.

In each iteration, after selecting the sample point population to be analyzed during the iteration, the noise likelihood determination sub-system 11 then determines the average distance between nearest-neighbor sample points which would be expected if the sample points were randomly-distributed in the region of interest(step 103) and the actual distances between nearest-neighbor sample points (step 104). The noise likelihood determination sub-system 11 in step 103 generates the expected average distance between nearest-neighbor sample points as $$\mu_r = 0.5\rho^{-\left(\frac{1}{2}\right)} \quad (1)$$

where "ρ" represents the spatial density of the sample points in the selected region, that is, N/A, where "N" represents the number of sample points in the selected population and "A" represents the area of the selected region.

The noise likelihood determination sub-system 11 in step 104 generates the actual distances between nearest-neighbor sample points as follows. Initially, the noise likelihood determination sub-system 11 establishes a distance matrix D including a number of rows and columns each associated with one of the sample points. The noise likelihood determination sub-system 11 then determines a distance value d(i,j) representing the distance between each pair of sample points (i,j). If the sample points are considered as points on a two-dimensional Cartesian plane (that is, a conventional x,y plane, with the values of the coordinates given for each point) such as shown in FIG. 3, the distance value d(a,b) representing the distance between any two sample points "a" and "b" is $$d(a, b) = \sqrt{(x_a - x_b)^2 + (y_a - y_b)^2} \quad (2)$$

where $(x_a, y_a)$ are the Cartesian coordinate values of sample point "a" and $(x_b, y_b)$ are the Cartesian values of sample point "b." Extensions to higher dimensions and other coordinate systems will be readily apparent to those skilled in the art. The noise likelihood determination sub-system 11 inserts each distance value d(a,b) so generated in the appropriate location of the distance matrix D, in particular at row "a" and column "b" for each pair of sample points. Ignoring the values along the diagonal d(a,a) of the distance matrix D (which, if generated by the noise likelihood determination sub-system 11 represent the distance between each point and itself), for each row "I," the matrix element d(I,j) ("j" being an index from "1" to the number "N" of sample points in the region) identifying the number having the lowest value is the minimum distance between the between the sample point associated with row I and any other sample point in the region. (Similarly, for each column "J," the matrix element d(i,J) ("i" also being an index from "1" to the number of sample points in the region) identifying the number having the lowest value is the minimum distance tween the sample point associated with column J and any other sample point in the region.) Representing the minimum value in each row "I" as "min $(d_{I,j})$," the actual average distance between nearest-neighbor sample points is $$\bar{r} = \frac{1}{N}[\min(d_{1,j}) + \min(d_{2,j}) + \cdots + \min(d_{N,j})] \quad (3)$$

where "N" corresponds to the number of sample points in the region.

Following step 104, the noise likelihood determination sub-system 11 generates a standard error value $\sigma_r$ of the nearest neighbor mean distance in a random population of density ρ as $$\sigma_r = \sqrt{\frac{4-\pi}{4N\pi\rho}} \quad (4)$$

where "π" corresponds to the mathematical constant (approximately 3.14159 . . . ) (step 105).

The noise likelihood determination sub-system 11 uses the values for $\mu_r$ (the average distance between nearest-neighbor sample points that would be expected if the distribution were randomly distributed), $\bar{r}$ (the actual average distance between nearest-neighbor sample points), and the error value $\sigma_r$ to generate a normal deviation statistic $$Z = \frac{\bar{r} - \mu_r}{\sigma_r} \quad (5)$$

(step 106) as a nearest-neighbor distance deviation assessment value which will be used in performing a significance test as described below in connection with step 125.

Following step 106, the noise likelihood determination sub-system 11 performs a series of operations to generate a second randomness identifier R, which it uses in determining the likelihood that the digital signal represents a random distribution. Initially, the noise likelihood determination sub-system 11 generates an interpoint spacing parameter value δ as follows. If it is assumed that the "N" sample points are in a region A=X×Y, in particular a two-dimensional region having a length "X" and a width "Y" (the length X and width Y may correspond to the distances of the region along the x-axis and the y-axis respectively, or they may correspond to the distances along the y-axis and the x-axis respectively; in the following, "X" will represent the length, or the larger dimension, of the region, and "Y" will represent the width, or the smaller dimension, of the region) the noise likelihood determination sub-system 11 performs a series of steps to generate a two-dimensional lattice L, having dimensions "R" and "C", which is the smallest lattice which covers all of the sample points in the region. It will be appreciated that, if the value of N is not a prime number (if N is originally a prime number, it can be augmented by adding at least one sample point in the population), the value of N can be expressed in terms of prime factors $P_j$ as $$N = \prod_{j=1}^{r} P_j^{\alpha_j} \quad (6)$$

(step 107). The noise likelihood determination sub-system 11 then generates a value corresponding to the number of "configurations" of N, that is, the number of two-integer factorizations of "N" (step 110) (The number of factorizations corresponds to the dimensionality of the region; in this case the region is two dimensions.) The number of configurations of N is given by $$\tau(N) = \prod_{j=1}^{R} (\alpha_j + 1) \quad (7)$$

where the values of $\alpha_j$ in equation (7) correspond to the values of the exponents in equation (6).

The noise likelihood determination sub-system 11 then uses τ(n), the number of configurations of N, to determine the number of non-trivial or non-redundant configurations (step 112), that is the number of configurations other than the ones for which N=N×1 or N=1×N (the trivial configurations), or N=R×C and N=C×R (the redundant configurations). It is clear that the number of non-trivial and non-redundant configurations corresponds to $$\Phi(RC) = \frac{\tau(N) - 2 + S}{2} \qquad (8)$$

where "S" has the value "one" if N is a square number (that is, $N=n^2$, where "n" is an integer), and "zero" otherwise. The noise likelihood determination sub-system 11 generates the set P of all two-element configurations as P={$R_1C_1$, $R_2C_2$, ..., $R_mC_m$}, where "m" is the number of non-trivial and non-redundant configurations as determine in response to equation (9) (step 113).

The noise likelihood determination sub-system 11 uses the set of configurations P generated in step 113 to generate a set of trial lattices (step 114), from which one will be selected as an optimal lattice. In particular, the noise likelihood determination sub-system 11 first identifies the configuration $R_j,C_j$ for which $R_j/C_j$ is closest to X/Y (that is, the configuration for which $X/Y-R_j/C_j$ is a minimum), where the value of X is greater than the value of Y, and the value of $R_j$ is greater than the value of $C_j$ (step 115). The noise likelihood determination sub-system 11 then generates the uniform interpoint spacing parameter δ as $$\delta = \sqrt{\frac{A}{N}} = \sqrt{\frac{XY}{R_jC_j}} \qquad (9)$$

where "A" represents the area of the region (step 116). The noise likelihood determination sub-system 11 checks for conformity of the dimensions of the selected lattice (that is, the lattice defined by $R_j$ and $C_j$) to the dimensions of the region (step 117) and if they do not conform, it adjusts the value of the uniform interpoint distance parameter δ to force conformance (step 120). In particular, if the value of $(R_j-1)\delta$ is greater than or equal to the value of X, or if the value of $(C_j-1)\delta$ is greater than or equal to the value of Y, then the noise likelihood determination sub-system 11 generates the value of the uniform interpoint distance parameter δ as follows:

$$\delta = \min\left[\frac{X}{R_j-1}, \frac{Y}{C_j-1}\right] - 0.1 \qquad (10)$$

where "min" refers to the "minimum" operator.

If the system 10 determines in step 116 that multiple configurations $R_jC_j$ provide the same minimum value for $X/Y-R_j/C_j$, it generates a value for the uniform interpoint distance parameter $\delta_j$ for each such configuration as described above in connection with equations (9) and (10), and selects the configuration which provides the maximum value for $\delta_k$. If multiple configurations provide the same maximum value for $\delta_k$, the system generates a value for $\overline{\Delta}$, a metric defining average unit lattice distance defined as $$\overline{\Delta} = \frac{12\sum_{i=1}^{R-1}\sum_{j=1}^{C-1}(R-i)(C-j)\sqrt{i^2+j^2} + RC(R^2+C^2-2)}{3(RC)(RC-1)} \qquad (11)$$

and selects the lattice configuration which provides the smallest value of $\overline{\Delta}$.

After generating a value for the interpoint spacing parameter δ, the system generates the value "R" as $$R = 2\delta\sqrt{\rho} \qquad (12)$$

(step 121) where, as above, "ρ" corresponds to the spatial density of sample points in the region, that is, ρ corresponds to "N/A," where "N" is the number of sample points and "A" represents the area of the region. The value of "R" generated as in equation (12) provides an indication of the degree of randomness of the points in the sample population. In particular, the value of "R" generated in equation (12) will range from "zero" to "two," with a value of zero indicating that all of the points in the region lie on the same point, and a value of "two" indicating that all of the points in the region are uniformly distributed. If the value of "R" in equation (12) is on the order of "one," the points are generally randomly distributed in the region.

Following step 121, the noise likelihood determination sub-system 11 performs a series of steps to generate a third statistic used in assessing randomness, in particular a plot representing the maximum dispersion of N test points arranged in "r" rows and "c" columns in the region A having a length "X" and a width "Y" using the uniform interpoint spacing δ determined above. Initially, the noise likelihood determination sub-system 11 performs a step 122 in which it uses the uniform interpoint spacing parameter δ and the number of lattice points "R" and "C" along each dimension of the lattice L to determine values of "p" and "q" which represent the displacement from the edges of the region A for the lattice L. In that operation, since the values of the length "X" and width "Y" for the region A are known, $$X=(R-1)\delta+p \qquad (13)$$

and $$Y=(C-1)\delta+q \qquad (14)$$

where "p" and "q" represent the respective differences between the length and width of the region A, with length X and width Y, and the length and width of the "R×C" lattice applied thereto. Accordingly, if it is assumed that the length X of the region A is along the "x-axis" and the width Y is along the "y-axis," the noise likelihood determination sub-system 11 generates the plot (step 123) using as points of the lattice defined by ($x_k,y_j$) where $$x_k = \frac{p}{2} + (k-1)\delta \qquad (15)$$

and $$y_j = \frac{q}{2} + (j-1)\delta, \qquad (16)$$

where "k" in equation (15) extends from zero to R-1 and "j" in equation (16) extends from zero to C-1.

The noise likelihood determination sub-system 11 generates the values for Z (equation (5)), R (equation (12)) and the maximum dispersion plot (step 123) for each of the plurality of populations. Accordingly, after it finishes step 123 for one population, it returns to step 103 to perform the operations for the next population (step 124). After performing the operations to generate values for Z, R and the uniform dispersion plot for all of the populations, it sequences to a step 125 to perform a conventional significance test. In that operation in connection with the value for Z, the noise likelihood determination sub-system 11 uses as the null hypothesis $$H_0 : \bar{r} = \mu_r \qquad (17)$$

as indicating that the points are randomly distributed, and as the alternate hypothesis $$H_1 : \bar{r} \neq \mu_r \qquad (18)$$

as indicating that the points are not randomly distributed. It will be appreciated that, if the points are randomly distributed, the values for $\bar{r}$, the average actual distance between points in the population, would be distributed around $\mu_r$, the average distance between points that would be expected if the points were randomly distributed, in a Gaussian distribution with a mean, or average, of $\mu_r$. The standard significance test, using values for $\bar{r}$, $\mu_r$ and the normal deviate value Z, will indicate the likelihood that the null hypothesis is correct. The noise likelihood determination sub-system 11 may perform similar operations in connection with the values or R and the uniform dispersion plots generated for all of the populations and determine an assessment as to the likelihood that the signal as received by the transducer was random, and provide that assessment to the information processing sub-system 13. The information processing sub-system 13 can use the randomness assessment in determining the utility of further analyzing the signal to attempt to extract information.

Although the noise likelihood determination sub-system 11 has been described in connection with assessing randomness in connection with a signal, such as an acoustic, electrical or electromagnetic signal, it will be appreciated that the sub-system 11 will find utility in other areas in which it is desirable to assess randomness.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A signal processing system comprising:
   transducer means for receiving an analog signal, the analog signal including a noise component and possibly also an information component, and generating in response a digital signal which is represented by a plurality of sample points distributed over a selected region;
   a noise likelihood determination sub-system for receiving said digital signal and for generating a random noise assessment that the digital signal comprises solely random noise, said noise likelihood determination sub-system generating the random noise assessment in response to a nearest-neighbor distance deviation assessment generated in response to distances between nearest-neighbor ones of the sample points in comparison with distances between a like number of nearest-neighbor reference points that are random distributed; and
   an information processing sub-system for receiving said digital signal and for processing it to extract said information component if the noise likelihood determination subsystem determines that the random noise assessment indicates that the digital signal does not comprise solely random noise.

2. A signal processing system as defined in claim 1 in which the noise likelihood determination sub-system generates the nearest-neighbor distance deviation assessment for a plurality of sample point populations, each comprising a plurality of sample points, and generates the random noise assessment in response to a standard significance test in connection with the nearest-neighbor distance deviation assessments generated for said populations.

3. A signal processing system as defined in claim 1 in which the noise likelihood determination sub-system includes:
   reference point distance determination means for generating an expected average distance value $\mu_r$ between reference points in the selected region as $$\mu_r = 0.5 \rho^{-\left(\frac{1}{2}\right)}$$

where "$\rho$" represents the spatial density of reference points in the selected region;
   sample point distance determination means for generating an average nearest-neighbor sample point distance value as $$\bar{r} = \frac{1}{N} [\min(d_{1,j}) + \min(d_{2,j}) + \ldots + \min(d_{N,j})]$$

where "N" corresponds to the number of sample points in the sample, and "$\min(d_{ij})$" corresponds to a minimum distance between sample points identified by indices "i" and "j;" and
   nearest-neighbor distance deviation assessment generating means for generating the nearest-neighbor distance deviation assessment value as $$Z = \frac{\bar{r} - \mu_r}{\sigma_r}$$

where $$\sigma_r = \sqrt{\frac{4 - \pi}{4 N \pi \rho}}.$$

4. A signal processing system comprising:
   transducer means for receiving an analog signal, the analog signal including a noise component and possibly also an information component, and generating in response a digital signal;
   a noise likelihood determination sub-system for receiving said digital signal and for generating a random noise assessment that the digital signal comprises solely random noise, said noise likelihood determination subsystem includes randomness statistic generating means for generating a randomness statistic in response to an interpoint spacing parameter statistic; and
   an information processing sub-system for receiving said digital signal for processing it to extract said information component if the noise likelihood determination subsystem determines that the random noise assessment indicates that the digital signal does not comprise solely random noise, the noise likelihood determination sub-system generating the random noise assessment in response to the randomness statistic.

5. A signal processing system as defined in claim 4 in which the randomness statistic generating means includes:

randomness lattice generating means for generating a uniform N-point randomness lattice over the region, where "N" corresponds to the number of sample points in the region, the randomness lattice generating means generating a lattice interpoint spacing parameter δ in generating the randomness lattice; and randomness lattice statistic generating means for generating a randomness statistic "R" in response to said lattice interpoint spacing parameter δ as $$R = 2\delta\sqrt{\rho}$$

where "ρ" corresponds to the spatial density of the sample points in the region, the noise likelihood determination sub-system using the randomness lattice and the randomness statistic "R" in generating the random noise assessment.

6. A signal processing method as defined in claim 4 in which the step of generating a randomness statistic includes the steps of:

generating a uniform N-point randomness lattice over the region, where "N" corresponds to the number of sample points in the region, the randomness lattice generating, generating a lattice interpoint spacing parameter δ in generating the randomness lattice; and generating a randomness statistic "R" in response to said lattice interpoint spacing parameter δ as $$R = 2\delta\sqrt{\rho}$$

where "ρ" corresponds to the spatial density of the sample points in the region, the noise likelihood determination sub-system using the randomness lattice and the randomness statistic "R" in generating the random noise assessment.

7. A signal processing method comprising the steps of:

receiving an analog signal including a noise component and possibly also an information component, and generating in response a digital signal which is represented by a plurality of sample points distributed over a selected region;

a noise likelihood determination step of generating in response to said digital signal a random noise assessment that the digital signal comprises solely random noise, said noise likelihood determination step including the step of generating the random noise assessment in response to a nearest-neighbor distance deviation assessment generated in response to distances between nearest-neighbor ones of the sample points in comparison with distances between a like number of nearest-neighbor reference points that are randomly distributed; and an information processing step of receiving and processing said digital signal to extract said information component if it is determined during the noise likelihood determination step that the random noise assessment indicates that the digital signal does not comprise solely random noise.

8. A signal processing method as defined in claim 7 in which the noise likelihood determination method includes the step of generating the nearest-neighbor distance deviation assessment for a plurality of sample point populations, each comprising a plurality of sample points, and generating the random noise assessment in response to a standard significance test in connection with the nearest-neighbor distance deviation assessments generated for said populations.

9. A signal processing method as defined in claim 7 in which the noise likelihood determination step includes the steps of:

generating an expected average distance value $\mu_r$ between reference points in the selected region as $$\mu_r = 0.5\rho^{-\left(\frac{1}{2}\right)}$$

where "ρ" represents the spatial density of reference points in the selected region;

generating an average nearest-neighbor sample point distance value as $$\bar{r} = \frac{1}{N}[\min(d_{1,j}) + \min(d_{2,j}) + \ldots + \min(d_{N,j})]$$

where "N" corresponds to the number of sample points in the sample, and "$\min(d_{ij})$" corresponds to a minimum distance between sample points identified by indices "i" and "j;" and generating the nearest-neighbor distance deviation assessment value as $$Z = \frac{\bar{r} - \mu_r}{\sigma_r}$$

where $$\sigma_r = \sqrt{\frac{4-\pi}{4N\pi\rho}}.$$

10. A signal processing method comprising the steps of:

receiving an analog signal including a noise component and possibly also an information component, and generating in response a digital signal;

a noise likelihood determination step of generating in response to said digital signal a random noise assessment that the digital signal comprises solely random noise, said noise likelihood determination step including the steps of generating a randomness statistic in response to an interpoint spacing parameter statistic, and generating the random noise assessment in response to the randomness statistic; and an information processing step of receiving and processing said digital signal to extract said information component if it is determined during the noise likelihood determination step that the random noise assessment indicates that the digital signal does not comprise solely random noise.

* * * * *